United States Patent [19]

Dowden, deceased et al.

[11] 4,438,835
[45] Mar. 27, 1984

[54] HAND OPERATED CONTROLS FOR MOTOR VEHICLE

[76] Inventors: William Dowden, deceased, late of Los Angeles; by Naomi Muckelroy, executrix, 324 E. 81st St., Los Angeles, Calif. 90003

[21] Appl. No.: 271,804

[22] Filed: Jun. 8, 1981

[51] Int. Cl.³ .................. B60K 41/20; G05G 9/08
[52] U.S. Cl. .................. 192/3 M; 74/480 R; 74/482; 180/320; 192/3 T
[58] Field of Search ............ 192/3 M, 3 T; 74/480 R, 74/481, 482; 180/320

[56] References Cited

U.S. PATENT DOCUMENTS

| | | | |
|---|---|---|---|
| 1,833,458 | 11/1931 | Giuffre | 74/481 |
| 2,597,379 | 5/1952 | Romel | 74/481 |
| 2,777,335 | 1/1957 | Engberg et al. | 74/481 |
| 2,849,890 | 9/1958 | Reesep | 74/481 |
| 2,953,036 | 9/1960 | Wendt | 74/481 X |
| 3,065,647 | 11/1962 | Whitmore | 74/482 X |
| 3,192,794 | 7/1965 | Counts | 74/481 |
| 3,749,212 | 7/1973 | Black | 74/482 X |
| 4,324,309 | 4/1982 | Ginley | 180/320 X |

*Primary Examiner*—Allan D. Herrmann
*Attorney, Agent, or Firm*—Erik M. Arnhem

[57] ABSTRACT

In a motor vehicle having a conventional fuel flow control foot pedal and brake control foot pedal, a pair of push-pull control rods are each separately rotatably clamped to the fuel flow control foot pedal and to the brake control foot pedal. The pair of push-pull control rods are slidably secured through at least one bearing plate, vertically adaptively attached to the top of the motor vehicle floor board. Each one of the control rods are positioned for active operation by at least one tension spring separately securing one push-pull rod to the bearing plate. A manual first lever is pivotedly connected to the push-pull rod terminus opposite the rod terminus secured to the brake pedal, the manual lever having one terminus pivotedly connected to the bearing plate. The push-pull rod connected to the fuel flow foot pedal can have a series of stop slots positioned across the rod, normal to the rod length, each one of the stop slots providing a rod hold position on engaging the lock slot stop on the bearing plate. A second lever is spring pivoted to the bearing plate, cooperatively lifting the fuel flow control rod from the lock slot stop, when the manual first lever is pushed so as to operate the brake pedal.

4 Claims, 1 Drawing Figure

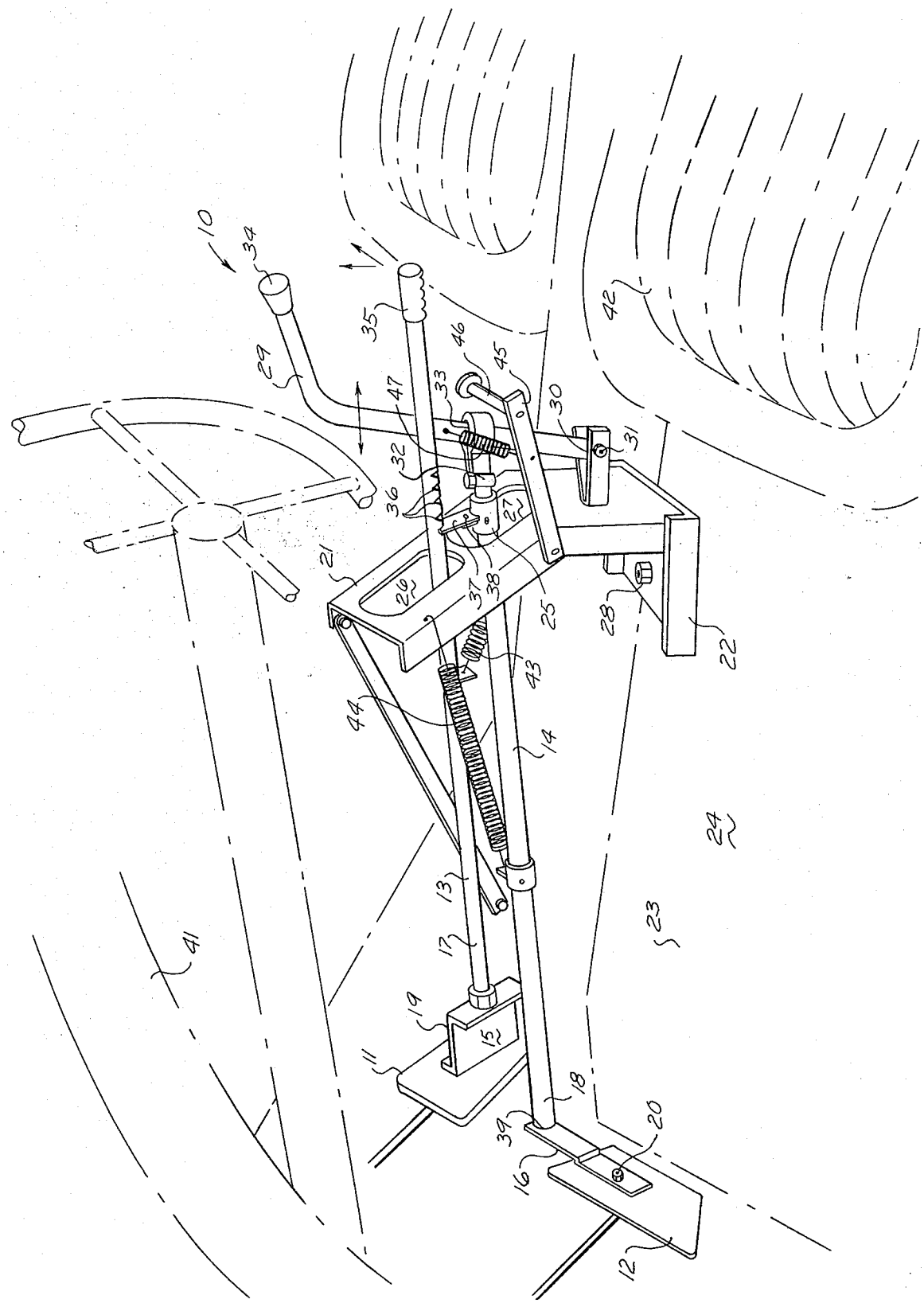

HAND OPERATED CONTROLS FOR MOTOR VEHICLE

BACKGROUND OF THE INVENTION

The hand operated controls for motor vehicles of this invention is classified in Class 74-Subclass 481.

Counts, in U.S. Pat. No. 3,192,794, issued July 6, 1965 discloses hand operated controls for a motor vehicle supported on the under surface of a motor vehicle. Pivotally mounted hand levers may be swung upwardly to move the brake pedal, clutch pedals, and accelerator of a motor vehicle.

In U.S. Pat. No. 2,849,890 issued Sept. 2, 1958, Reeser discloses a remote control operating device for motor vehicles wherein the vehicle can be operated without securing the device to any vehicle pedals. The device can be operated by a mechanic at work in a motor vehicle, located remotely from a brake or gas pedal, utilizing pivoted rods.

Romel patented on May 20, 1952 U.S. Pat. No. 2,597,379, a dual control device for motor vehicles particularly useful for driving instructors. The device is secured to the front seat of a motor vehicle.

Guiffre, in U.S. Pat. No. 1,833,458 issued Nov. 24, 1931, disclosed a clutch and brake pedal operating mechanism. The operating mechanism has two rods pivotally disposed below the motor vehicle floor board. The rods are operatively secured to the clutch and brake pedals and also to a pair of hand levers. The hand levers are pivotally rotated forward and rearward, to operate the clutch and brake pedals.

SUMMARY OF THE INVENTION

A conventional motor vehicle, with an automatic gear shift transmission and a conventional fuel flow control foot pedal and a brake control pedal, has a pair of push-pull control rods disposed and separately each clamped to the fuel flow control pedal and brake pedal, by rotatable clamps, each affixed to a first terminus of each control rod and a pedal. The pair of control rods extend in an approximate parallel configuration with the vehicle floor board of the driver's compartment, extending back to the driver's convenient hand reach. The pair of control rods are slidably disposed and secured through a vertical bearing plate which is affixed at a bearing base to the driver's compartment floor. The bearing plate can support the pair of control rods in separate bearing apertures, sized and adapted to provide slidable positioning support for each separate push-pull control rod.

Each control rod is positioned in operation by a tension spring adaptively sized to maintain the control rod in an operative position under spring tension. The brake pedal control rod has a brake first lever pivotally affixed at a first lever terminus to the bearing plate, providing lever motion parallel to the brake control rod motion in the bearing plate aperture. The second terminus of the brake control rod is pivotally secured to and approximately normal to the brake first lever, providing push-pull brake control rod motion to the brake pedal on pivotally rotating the brake lever. The first lever second terminus can have a right angle bend providing a band handle. The fuel flow control rod has multiple rod position notches disposed on the control rod normal to the rod length on the rod underside adjacent to the driver compartment floor. The position notches can lock the fuel flow control pedal in a Position providing positive fuel flow rate, when a rod position notch is engaged in a lock slot stop on the bearing plate.

A second lever is spring pivoted to the bearing plate, cooperatively lifting the fuel flow control rod from the lock slot stop, when the manual first lever is pushed so as to operate the brake pedal. A tension spring secured to the bearing plate and to the fuel flow control rod maintains the tensioned rod in a desirable position for the fuel flow rate.

Included in the objects of this invention are:

To provide means for a paraplegic lacking leg mobility to operate a motor vehicle.

To provide a simple and easily installed set of hand operated controls for a motor vehicle.

To provide a moderate cost, simple set of hand operated controls for a motor vehicle useful to some paraplegics.

To provide a moderate cost set of hand operated controls for a motor vehicle which can easily be installed and removed from a conventional modern motor vehicle with an automatic gear transmission.

Other objects and advantages of this invention are taught in the following description and claims.

BRIEF DESCRIPTION OF THE DRAWING

The description of this invention is to be read in conjunction with the following drawing:

FIG. 1 is an elevational perspective view of the hand operated controls for a motor vehicle disposed and secured in an operative location in a vehicle.

DESCRIPTION OF THE PREFERRED EMBODIMENT OF THE INVENTION

Referring to FIG. 1 in detail, the hand operated control for motor vehicles 10 is shown in elevational perspective and is particularly useful for motor vehicle drivers unable to properly utilize their paralysed legs while driving vehicles. The conventional fuel flow control foot pedal 11 and the conventional brake control foot pedal 12 have a pair of push-pull rigid control rods, the first fuel control rod 13 and the second brake control rod 14, secured by the respective first clamp means 15 and the second clamp means 16, to the respective fuel foot pedal 11 and the brake foot pedal 12. The clamps 15 and 16 are rotatably secured to the respective control rods 13 and 14 at the respective first termini 17 and 18 of rods 13 and 14. A second bolt 19 in clamp 15 and a second bolt 20 in clamp 16 complete the securing of the respective clamps 15 and 16 to the foot pedals 11 and 12.

A bearing plate 21, having a secured fixed base 22, is secured to the floor 23 of the driver compartment 24 of the motor vehicle. Adaptively sized apertures 26 and 27 are disposed in the bearing plate 21, as by casting on one-piece 21 and base 22. The apertures 26 and 27 are elongated in an upright dimension, providing space for the vertical movement of rods 13 and 14. The bearing plate base 22 is secured to the floor 23 by fasteners 28 and the like. The brake first lever 29 is pivotally connected at the first lever terminus 30 to the bearing plate 21 in elongated aperture 27 by the pivot bolt 31. The control rod 14 is pivotally secured at its second rod terminus 32 to the mid-lever location 33 of lever 29. The lever 29 terminates in a second manual hand terminus 34. The control rod 14 rises and falls vertically in the elongated sleeve 25, as the lever 29 moves forward and to the rear, operating the brake pedal 12 by hand at 34.

The control rod 13 extends through the elongated aperture 26, terminating in the second terminus handle 35. Multiple spaced rod position V-shaped notches 36 are disposed on the rod 13 underside normal to the rod 13 length. The rod 13 position is fixed and held by engaging a selected one of the V-shaped notches 36 with the lock slot stop means 37, secured in the aperture 26 by fastener 38. The fuel flow rate is controlled by positioning the rod 13 at the desired selected notch 36 along the rod 13 length. By lifting the rod terminus 35 and repositioning the rod selected notch 36, the fuel flow rate can be simply controlled by the hand of the vehicle driver.

The brake pedal 12 is shown with a clamp 16 secured across the pedal, tightly clamped by fastener 20. The push-pull rod 14 terminates at the first terminus 18 which is rotatably secured in an aperture 39 of clamp 16. The first terminus 18 has a bolt type head 40 (not shown) disposed on the clamp 16 underside which prevents the terminus 18 from disengaging through the loose fitting aperture 39. A similar bolt head on the first terminus 17 of rod 13 of the gas pedal clamp 15 prevents the rod 13 from disengaging from the loose fitting aperture in clamp 15.

At least two spring means 43 and 44, disposed and secured in tension mode, are separately sized and adaptively secured to upright bearing plate 21 and to the respective push-pull control rods 13 and 14 respectively. The springs 43 and 44 are positioned to provide for the non-operative retraction of rods 13 and 14 unless the rods are specifically positioned for operation by the driver's hand. When brake first lever 29 is manually moved forward to apply the brake pedal 12, the brake second lever 45 is cooperatively pivotally rotated forward by tension spring 47 and upwardly. The handle 46 of lever 45 is lifted by tension spring 47, and the fuel control rod 13 set at selected notch 36 stops the fuel flow as spring 43 pulls up pedal 11. The lever 45 is pivotally secured to bearing plate 21.

The hand operated control 10 is anchored to the floor 23 of the driver compartment 24, behind the dashboard 41, as positioned for the disabled driver in seat 42.

The bearing plate 21 and plate base 22 can be cast in one piece complete with apertures and selected plate angles and made of aluminum, zinc die cast, steel or polycarbonate plastic, or the like. The dimensions of the controls 10 are sized and adapted as needed by the driver. The rods 13 and 14 can be steel, as needed.

Many modifications in the hand operated controls for motor vehicles can be made in the light of my teachings. It is understood that within the scope of the claims, the invention can be practiced otherwise than as described.

GLOSSARY

10—hand operated control drive for motor vehicle
11—gas pedal
12—brake pedal
13—gas push-pull rod
14—brake push-pull rod
15—rotatable clamp—gas push-pull rod
16—rotatable clamp—brake push-pull rod
17—first terminus—gas rod
18—first terminus—brake rod
19—second bolt in 15
20—second bolt in 16
21—bearing plate—upright
22—bearing plate base
23—driver compartment floor
24—driver compartment
25—elongated sleeve
26—second elongated aperture
27—third elongated aperture
28—fasteners for base 22
29—upright brake lever
30—lever (29)—first terminus
31—pivot bolt
32—second rod 14 terminus
33—mid-lever location on lever (29)
34—manual hand terminus of (29)
35—second terminus handle of rod (13)
36—spaced rod position notches
37—lock slot stop means
38—fastener
39—aperture in clamp (16)
40—bolt type head of (18)
41—dashboard
42—seat-car
43—spring means—tension spring
44—spring means—tension spring
45—second lever
46—handle of (45)
47—Spring

I claim:
1. In a motor vehicle having a conventional automatic gear transmission, a brake pedal, and a fuel flow control foot pedal disposed in a driver compartment, the hand operated vehicle controls comprising:
   a first push-pull control rod disposed and separately clamped to a fuel flow control foot pedal at a first control rod first terminus,
   a clamp rotatably secured to said first control rod first terminus and to said fuel flow foot pedal,
   a second push-pull control rod disposed and separately clamped to a brake pedal at a second control rod first terminus,
   a second clamp rotatably secured to said second control rod first terminus and to said brake pedal,
   a bearing plate extending upright from the floor of said driver compartment and adaptively angularly positioned and secured at a base plate to said floor,
   two guiding and sliding apertures disposed in said upright bearing plate, each one of said apertures holding and guiding a separate said first and second push-pull control rod slidable in said apertures,
   a brake first lever pivotally secured at a first brake lever terminus to said bearing plate and pivotally secured at a mid-lever location to said second push-pull rod second terminus, the second terminus of said lever formed into a manual hand handle,
   multiple spaced rod position notches on said first push-pull control rod disposed normal to the rod length on the rod underside adjacent to the driver compartment floor,
   a lock slot stop disposed in said sliding aperture of said bearing plate, engagable with one of said multiple position notches of said first push-pull control rod,
   a brake second lever pivotally secured at a first lever terminus to said bearing plate and having a second lever terminus handle curved to rotate forward and upwardly, lift said first push-pull control rod from said lock slot stop, when said brake first lever is cooperatively moved forward, and
   at least two spring means, each anchored at a first spring means terminus of each means to said bearing plate and at a second terminus of each spring means anchored to said first push-pull rod and said second push-pull rod, providing tension means retracting said first and second push-pull rods to a non-operative position.

2. A combination as set forth in claim 1, wherein said brake second lever has said second lever terminus disposed parallel to said driver compartment floor.

3. In a motor vehicle having a conventional automatic gear transmission, a brake pedal, and a fuel flow control foot pedal disposed in a driver compartment, the hand operated vehicle controls comprising:

a first push-pull control rod disposed and separately clamped to a fuel flow control foot pedal at a first control rod first terminus, a clamp means rotatably secured to said first control rod first terminus and to said fuel flow foot pedal, a second push-pull control rod disposed and separately clamped to a brake pedal at a second control rod first terminus, a second clamp means rotatably secured to said second control rod first terminus and to said brake pedal, a bearing plate extending upright from the floor of said driver compartment and adaptively angularly positioned and secured at a base plate to said floor.

at least two guiding and sliding aperture means disposed in said upright bearing plate, each one of said aperture means holding and guiding a separate said first and second push-pull control rod slidable in said aperture means, a brake first lever pivotally secured at a first brake lever terminus to said bearing plate and pivotally secured at a mid-lever location to said second push-pull rod second terminus, the second terminus of said lever formed into a manual hand handle, multiple means spaced rod position notches on said first push-pull control rod disposed normal to the rod length on the rod underside adjacent to the driver compartment floor, a lock slot stop means disposed in said sliding aperture of said bearing plate, engagable with one of said multiple position notches of said first push-pull control rod, a brake second lever pivotally secured at a first lever terminus to said bearing plate and having a second lever terminus handle curved to rotate forward and upwardly, lift said first push-pull control rod from said lock slot stop, when said brake first lever is cooperatively moved forward, and, at least two spring means, each anchored at a first spring means terminus of each means to said bearing plate and at a second terminus of each spring means anchored to said first push-pull rod and said second push-pull rod, providing tension means retracting said first and second push-pull rods to a non-operative position.

4. A combination as set forth in claim 3, wherein said brake second lever has said second lever terminus disposed parallel to said driver compartment floor.

* * * * *